United States Patent
Michalakis

(10) Patent No.: US 11,386,055 B2
(45) Date of Patent: Jul. 12, 2022

(54) ADAPTIVE STORAGE OF DATA CAPTURED BY ONE OR MORE VEHICLES

(71) Applicant: Toyota Research Institute, Inc., Los Altos, CA (US)

(72) Inventor: Nikolaos Michalakis, Saratoga, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 242 days.

(21) Appl. No.: 15/903,497

(22) Filed: Feb. 23, 2018

(65) Prior Publication Data

US 2019/0266264 A1 Aug. 29, 2019

(51) Int. Cl.
| | |
|---|---|
| G06F 16/215 | (2019.01) |
| G07C 5/00 | (2006.01) |
| G07C 5/02 | (2006.01) |
| G06F 16/22 | (2019.01) |
| G06F 16/951 | (2019.01) |
| H04L 67/12 | (2022.01) |
| G05D 1/00 | (2006.01) |

(52) U.S. Cl.
CPC ............ *G06F 16/215* (2019.01); *G06F 16/22* (2019.01); *G06F 16/951* (2019.01); *G07C 5/008* (2013.01); *G07C 5/02* (2013.01); *G05D 1/0088* (2013.01); *G05D 2201/0213* (2013.01); *H04L 67/12* (2013.01)

(58) Field of Classification Search
None
See application file for complete search history.

(56) References Cited

U.S. PATENT DOCUMENTS

| | | | |
|---|---|---|---|
| 6,122,572 A | 9/2000 | Yavnai | |
| 8,352,112 B2 | 1/2013 | Mudalige | |
| 9,432,929 B1 | 8/2016 | Ross et al. | |
| 9,953,535 B1* | 4/2018 | Canavor | G05D 1/0289 |
| 2005/0159890 A1 | 7/2005 | Humphries et al. | |
| 2006/0026164 A1* | 2/2006 | Jung | G01D 9/005 |
| 2007/0208495 A1* | 9/2007 | Chapman | G08G 1/0104 |
| | | | 701/117 |
| 2008/0224866 A1* | 9/2008 | Rehman | G08B 13/2417 |
| | | | 340/572.1 |
| 2011/0095908 A1 | 4/2011 | Nadeem et al. | |
| 2012/0197898 A1* | 8/2012 | Pandey | G06F 16/2264 |
| | | | 707/741 |
| 2013/0041747 A1* | 2/2013 | Anderson | H04N 21/8549 |
| | | | 705/14.39 |

(Continued)

FOREIGN PATENT DOCUMENTS

| | | |
|---|---|---|
| EP | 0708427 A2 | 4/1996 |
| WO | 2017111126 A1 | 6/2017 |

*Primary Examiner* — Yu Zhao

(74) *Attorney, Agent, or Firm* — Christopher G. Darrow; Darrow Mustafa PC

(57) ABSTRACT

Methods and systems for coordinated data collection through one or more vehicles. The methods and systems can include presenting a data request for sensor data to one or more vehicles, receiving data samples from the vehicles, selecting a target data sample from the data samples, creating a selection range using the target data sample, transmitting the selection range to the vehicles to create a selected data set, identifying excluded data for deletion, and receiving the selected data set from the vehicles to respond to the data request.

17 Claims, 5 Drawing Sheets

(56) References Cited

U.S. PATENT DOCUMENTS

| | | |
|---|---|---|
| 2014/0195105 A1* | 7/2014 | Lambert ................. G07C 5/08 |
| | | 701/33.4 |
| 2015/0205298 A1 | 7/2015 | Stoschek et al. |
| 2015/0234387 A1 | 8/2015 | Mullan et al. |
| 2016/0247106 A1 | 8/2016 | Dalloro et al. |
| 2016/0247109 A1 | 8/2016 | Scicluna et al. |
| 2017/0161044 A1* | 6/2017 | Singh ................. G06F 9/45558 |
| 2018/0100748 A1* | 4/2018 | Waniguchi ............ G08G 1/202 |
| 2018/0174485 A1* | 6/2018 | Stankoulov .......... G09B 19/167 |
| 2018/0188045 A1* | 7/2018 | Wheeler ................ G06F 16/29 |
| 2018/0293809 A1* | 10/2018 | James .................... H04W 4/38 |

* cited by examiner

US 11,386,055 B2

ADAPTIVE STORAGE OF DATA CAPTURED BY ONE OR MORE VEHICLES

TECHNICAL FIELD

Embodiments described herein generally relate to coordination of data collection. More specifically, embodiments generally relate to data collection in response to a data request.

BACKGROUND

Vehicles equipped with sensors can collect information during driving. Current systems download and store all data generated by a vehicle for processing and analysis. However, oftentimes, some of the data generated by the vehicle may not be valuable or desirable. Further, the data being sent consumes bandwidth on the networks. Thus, much of the storage space includes data that is not useful. As such, storage space in the vehicle and on the network is wasted, and processing time is also wasted analyzing this data.

SUMMARY

The systems and methods described herein disclose request-based data collection for use with one or more capable vehicles. In one embodiment, a data coordination system for request-based data collection is disclosed. The data coordination system can include one or more processors; and a memory communicably coupled to the one or more processors and storing a requisition module including instructions that when executed by the one or more processors cause the one or more processors to present a data request for sensor data to one or more vehicles, the sensor data being collected using one or more sensors, and to receive one or more data samples from the one or more vehicles, the one or more data samples being a temporally selected subset of the sensor data. The memory can further store a data targeting module including instructions that when executed by the one or more processors cause the one or more processors to select a target data sample from the one or more data samples, to create a selection range using the target data sample, and to transmit the selection range to the one or more vehicles, the selection range being applied to create a selected data set from the sensor data. The memory can further store a request fulfillment module including instructions that when executed by the one or more processors cause the one or more processors to identify excluded data of the sensor data for deletion, the excluded data being outside of the selection range, and to receive the selected data set from the one or more vehicles, the selected data set being responsive to the data request.

In another embodiment, a non-transitory computer-readable medium for request-based data collection is disclosed. The non-transitory computer-readable medium can store instructions that when executed by one or more processors cause the one or more processors to present a data request for sensor data to one or more vehicles, the sensor data being collected using one or more sensors. The non-transitory computer-readable medium can further store instructions to receive one or more data samples from the one or more vehicles, the one or more data samples being a temporally selected subset of the sensor data. The non-transitory computer-readable medium can further store instructions to select a target data sample from the one or more data samples. The non-transitory computer-readable medium can further store instructions to create a selection range using the target data sample. The non-transitory computer-readable medium can further store instructions to transmit the selection range to the one or more vehicles, the selection range being applied to create a selected data set from the sensor data. The non-transitory computer-readable medium can further store instructions to identify excluded data of the sensor data for deletion, the excluded data being outside of the selection range. The non-transitory computer-readable medium can further store instructions to receive the selected data set from the one or more vehicles, the selected data set being responsive to the data request.

In another embodiment, a method for request-based data collection is disclosed. The method can include presenting a data request for sensor data to one or more vehicles, the sensor data being collected using one or more sensors. The method can further include receiving one or more data samples from the one or more vehicles, the one or more data samples being a temporally selected subset of the sensor data. The method can further include selecting a target data sample from the one or more data samples. The method can further include creating a selection range using the target data sample. The method can further include transmitting the selection range to the one or more vehicles, the selection range being applied to create a selected data set from the sensor data. The method can further include identifying excluded data of the sensor data for deletion, the excluded data being outside of the selection range. The method can further include receiving the selected data set from the one or more vehicles, the selected data set being responsive to the data request.

BRIEF DESCRIPTION OF THE DRAWINGS

So that the manner in which the above recited features of the present disclosure can be understood in detail, a more particular description of the disclosure, briefly summarized above, may be had by reference to the embodiments, some of which are illustrated in the appended drawings. It is to be noted, however, that the appended drawings illustrate only typical embodiments of this disclosure and are therefore not to be considered limiting of its scope. The disclosure may admit to other equally effective embodiments.

To facilitate understanding, identical reference numerals have been used, wherever possible, to designate identical elements that are common to the Figures. Additionally, elements of one embodiment may be advantageously adapted for utilization in other embodiments described herein.

DETAILED DESCRIPTION

Figure 1:
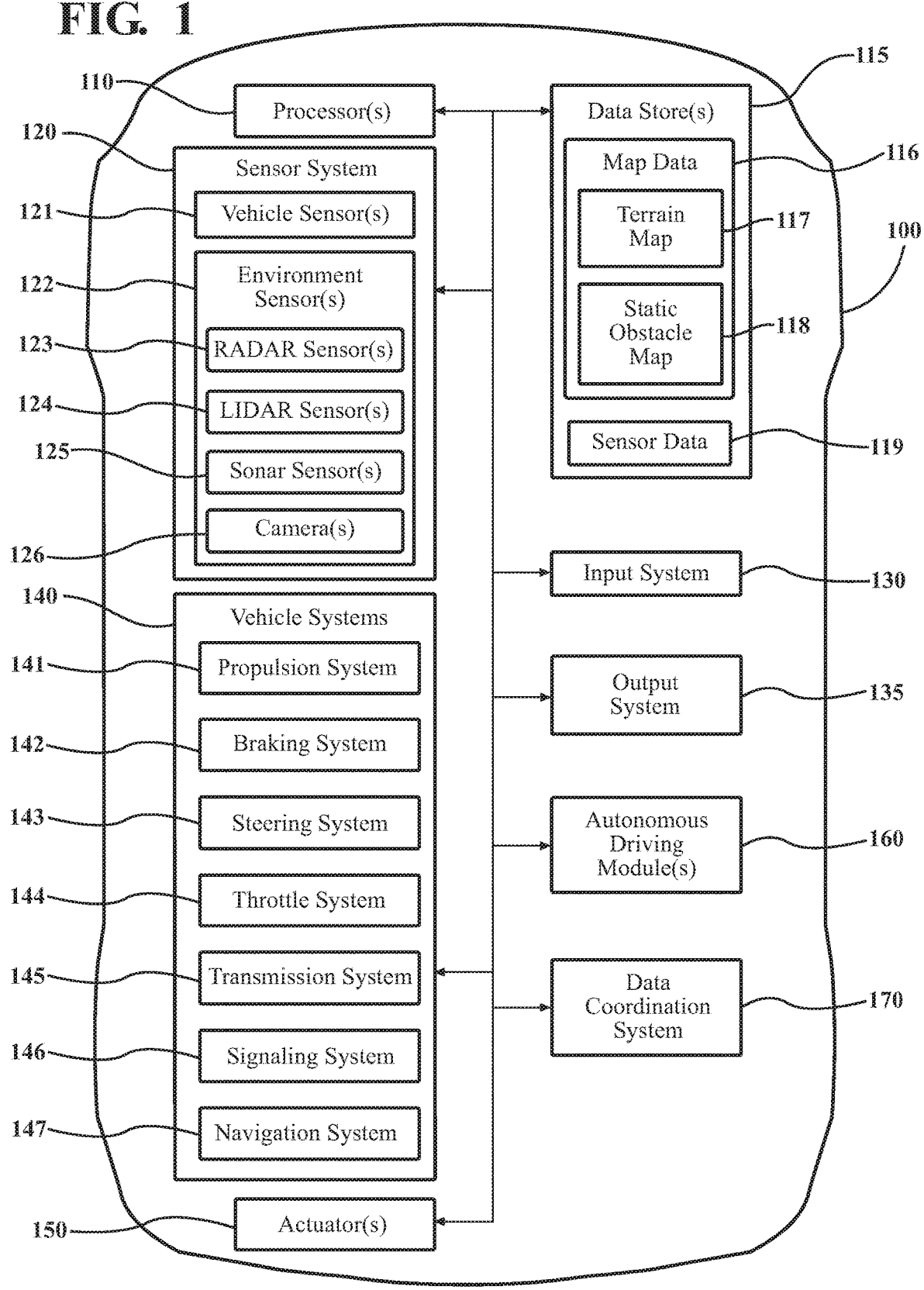
FIG. 1 is a block diagram of a vehicle incorporating or interacting with a data coordination system, according to embodiments described herein.

Embodiments disclosed herein include systems and methods for requesting and collecting specific data sets, including exclusionary delete. Embodiments described herein can include a data coordination system and methods usable for managing assigned tasks. The data coordination system can include a remote server. The remote server can be a cloud service manager or other computing device/system capable of implementing the system described herein. The remote server can process one or more data requests (e.g., requests by a user, engineer, etc.). Some examples of a request can include capture intersections via LIDAR, capture camera data when the vehicle hits a pothole and the vehicle shakes, time frame requests related to an event, and requests for capture of camera and LIDAR data of the vehicle in front of the host vehicle when the vehicle changes lanes. Requests can include a number or number range of incidents to collect, such as 1000 incidents or from 1000 to 3000 incidents.

The data coordination system and method can have access to all live vehicles (e.g., the fleet) currently on the road (or going to be on the road) that are equipped with the sensors that can satisfy the request. The access can be monitored and coordinated through the remote server. In one embodiment, the data coordination system can submit the request through the remote server to a subset of the fleet that is capable of satisfying the request in a timely manner (referred to as "capable vehicle(s)"). In some examples, the data coordination system and method can send the request to a subset of capable vehicles that is less than the requested number of incident (e.g., if the request is for 1M incidents, then it may be acceptable to send the request to a subset including 10K vehicles). In another embodiment, the data coordination system and method can post or otherwise provide the requests to a central source. The requests can include one or more criteria. Each vehicle can then poll the central source (e.g., as presented from the remote server) to determine if there are any requests waiting for the capable vehicle. In further embodiments, the remote server can transmit requests to each vehicle in the subset.

Each capable vehicle can include a local system. The local system can access the sensor data, such as sensor data that are stored in a data store. The local system can then process the arriving sensor data, to determine if the sensor data matches any of the criteria from the data request received from the data coordination system. If a match exists, the sensor data and sensor metadata from the local engine, is stored in a data store and tagged as requested data for use in the data request. In another embodiment, the data coordination system and method can, in some examples, receive requested or unprompted information on how many incidents the capable vehicle has captured (e.g., how many incidents in outstanding requests have been filled). Once the requested number of incidents has been captured by vehicles in the subset, the data coordination system and method can select the requested data from the sensor data and mark the request completed. The data coordination system and method can then delete, withdraw, or otherwise cancel the request from all capable vehicles in the subset. The requested data can be uploaded from the capable vehicle (e.g., in real-time or at a later date/time depending on size/request parameters/bandwidth), the request completes and the requester is notified that the dataset has been collected.

In further embodiments, the data coordination system and methods can include exclusionary delete. In this embodiment, the system and methods for selecting what data is interesting in the network can be part of the remote server. The vehicles can be equipped with systems and methods including a deletion mechanism that can remove data or information that is not needed. The vehicles can respond or automatically send data and information at specified time intervals, such as every few seconds/minutes (e.g., a video frame, or LIDAR frame every 30 seconds). The vehicles can upload in a distributed fashion, such as 10-100s data frames/sec. The data coordination system and methods can keep track of the one or more requests that have been presented for data collection. When data related to the one or more requests is collected (e.g., "capture 1000 LIDAR frames on intersections"), the data coordination system and methods can determine the data range based on samples. The data coordination system and methods can then send a selection request to the vehicle, wherein the vehicle can retain data related to the selection request. The selection request can include selection of a data set from the sensor data based on one or more parameters, such as time range, color range, pixel selection, or others. In one example, the selection request includes a time frame around a timestamp (e.g., "please retain 10s before and after frame X on timestamp Y, delete anything prior to that that has not been marked as RETAIN already"). Embodiments disclosed herein are more clearly described with reference to the figures below.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any other form of motorized transport that, for example, can operate at least semi-autonomously. The vehicle 100 can further include a communication system 131, such as a display, an augmented reality (AR) system or capabilities to support such a communication system, and thus benefits from the functionality discussed herein.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-5 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those having ordinary skill in the art, however, will understand that the embodiments described herein may be practiced using various combinations of these elements.

The vehicle 100 can further include a data coordination system 170, or components of a data coordination system 170, that is implemented to perform methods and other functions as disclosed herein relating to collection of data based on a data request. The data coordination system 170 can include a number of modules configured with instructions to perform the variety of functions listed below. In one example, the vehicle 100 is equipped with the data coordination system 170, including requisition module for conveying the data request to the vehicle, a data targeting module having instructions to select portions of the sensor data, and a request fulfillment module having instructions to receive the responsive data while identifying the excluded data. The other modules or systems described herein can be in communication with all or a part of the data coordination system 170.

Figure 2:
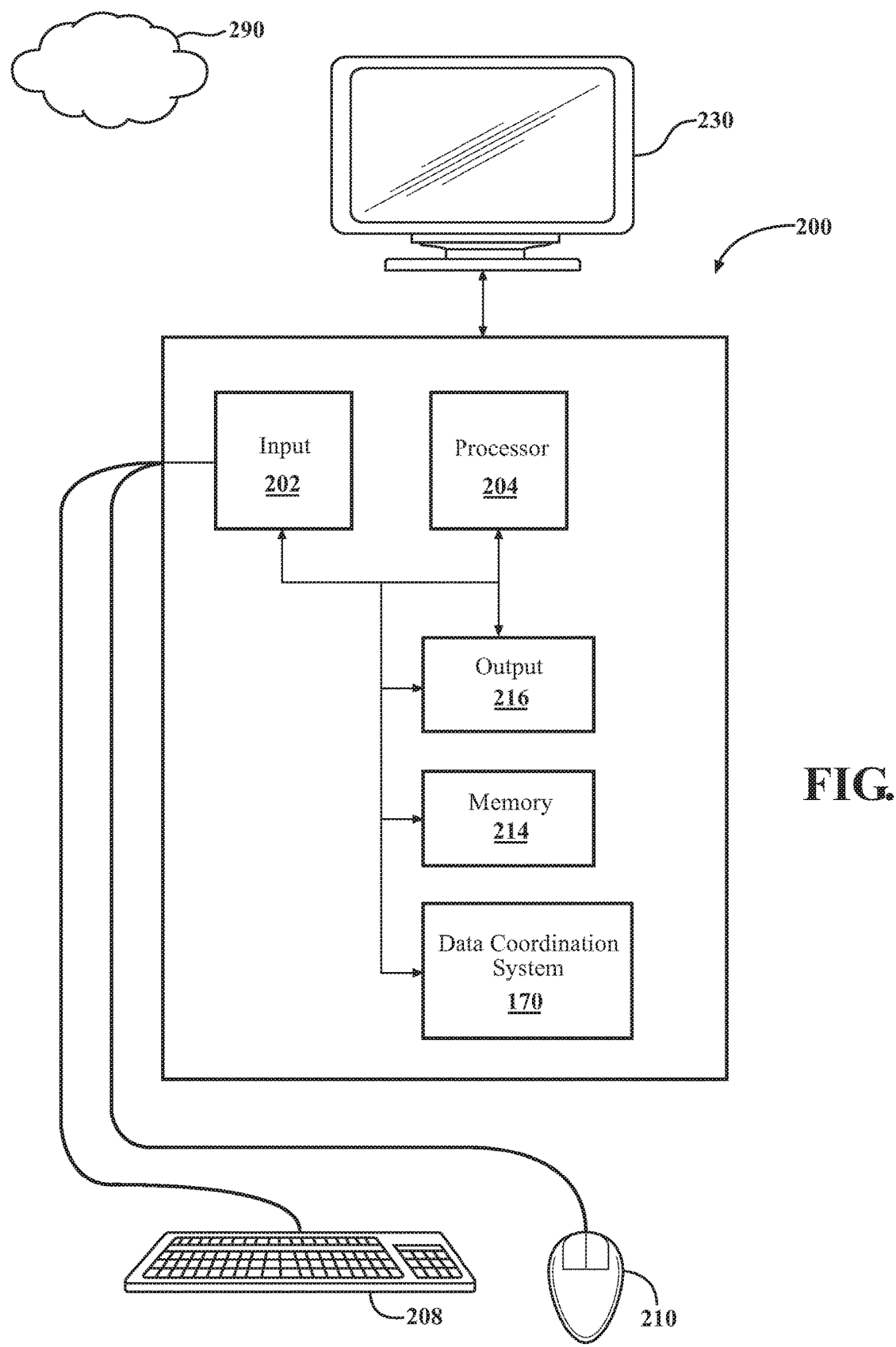
FIG. 2 is a block diagram of a computing device incorporating a data coordination system, according to embodiments described herein.

Referring to FIG. 2, an example of a computing device 200 in communication with the vehicle 100 is illustrated. The computing device 200 can be any appropriate type of computing device such as, but not limited to, a personal computer (PC), workstation, embedded computer, or standalone device with a computational unit, such as a microprocessor, DSP (digital signal processor), FPGA (field programmable gate array), or ASIC (application specific integrated circuit). Shown here, the computing device 200 is a server connected with a display device 230. While arrangements will be described herein with respect to servers, it will be understood that embodiments are not limited to servers and can be any form of computing device. In some implementations, the computing device 200 can be any other form of computer device that, for example, can operate at least semi-autonomously, receive data transmissions from one or more vehicles and can benefits from the functionality discussed herein.

The computing device 200 can have an input 202 for obtaining images for analysis and final identification and/or verification. The input 202 is one or more connections, either wired or wireless, for an input device to the computing device 200. The input 202 can be any suitable communication interface depending on device type and include, but is not limited to, USB (universal serial bus), frame grabber, Ethernet, or Firewire. The computing device 200 further includes a processor 204, such as a general purpose processor, for use in the data processing and analysis described herein. The input 202 be connected with sensors, such as the sensor system 120, or other active or passive input devices or systems. Shown here, the input 202 is connected with a keyboard 208 and a mouse 210. The computing device 200 can still further include connection 212. The connection 212, which can be wired or wireless, can allow the computing device 200 to communicate with other computing devices, locally or remotely, such as over a network protocol (e.g., Ethernet or similar protocols), such as a network 290. The network 290, depicted here as a cloud, can be any type of network or remote connection device/system, including a local area network (LAN) or a wide area network (WAN), or the connection can be made to an external computer (for example, through the Internet using an Internet Service Provider). The connection 212 can further be connected with remote devices associated with other computing devices or systems, such as the sensors system 120 and the data store 115 as described with reference to the vehicle 100.

The computing device 200 can further include some volatile or non-volatile memory, such as memory 214. The memory 214 can include one or more modules that include computer readable instructions that, when executed by the processor 204, cause the processor 204 to perform methods and functions that are discussed herein. The memory 214 can include a database 310, described with reference to FIG. 3. The memory 214 can contain information related to a reference material for comparison and/or analysis purposes. The computing device 200 can also include output connection 216 for conveying output in a fashion which is usable by the vehicle 100 or a user. In one example, the output connection 216 conveys output to a screen for convenient viewing (e.g., display device 230) or to a control device.

The computing device 200 further includes a data coordination system 170 that is implemented to perform methods and other functions as disclosed herein collection of data with the use of data sampling. The data coordination system 170 can be on the vehicle, on the server, or distributed between the two as desired. The data coordination system 170 includes a plurality of modules to perform the functions described herein, including requisition module for conveying the data request to the vehicle, a data targeting module having instructions to select portions of the sensor data, and a request fulfillment module having instructions to receive the responsive data while identifying the excluded data. In one or more embodiments, the data coordination system 170 can communicate via a wired or wireless connection with the vehicle 100 to correlate functionality as discussed herein. The data coordination system 170 can be in communication with one or more vehicles to receive sensor data in relation to a data request. In one embodiment, the vehicle 100 is representative of the one or more vehicles, as used herein.

Figure 3:
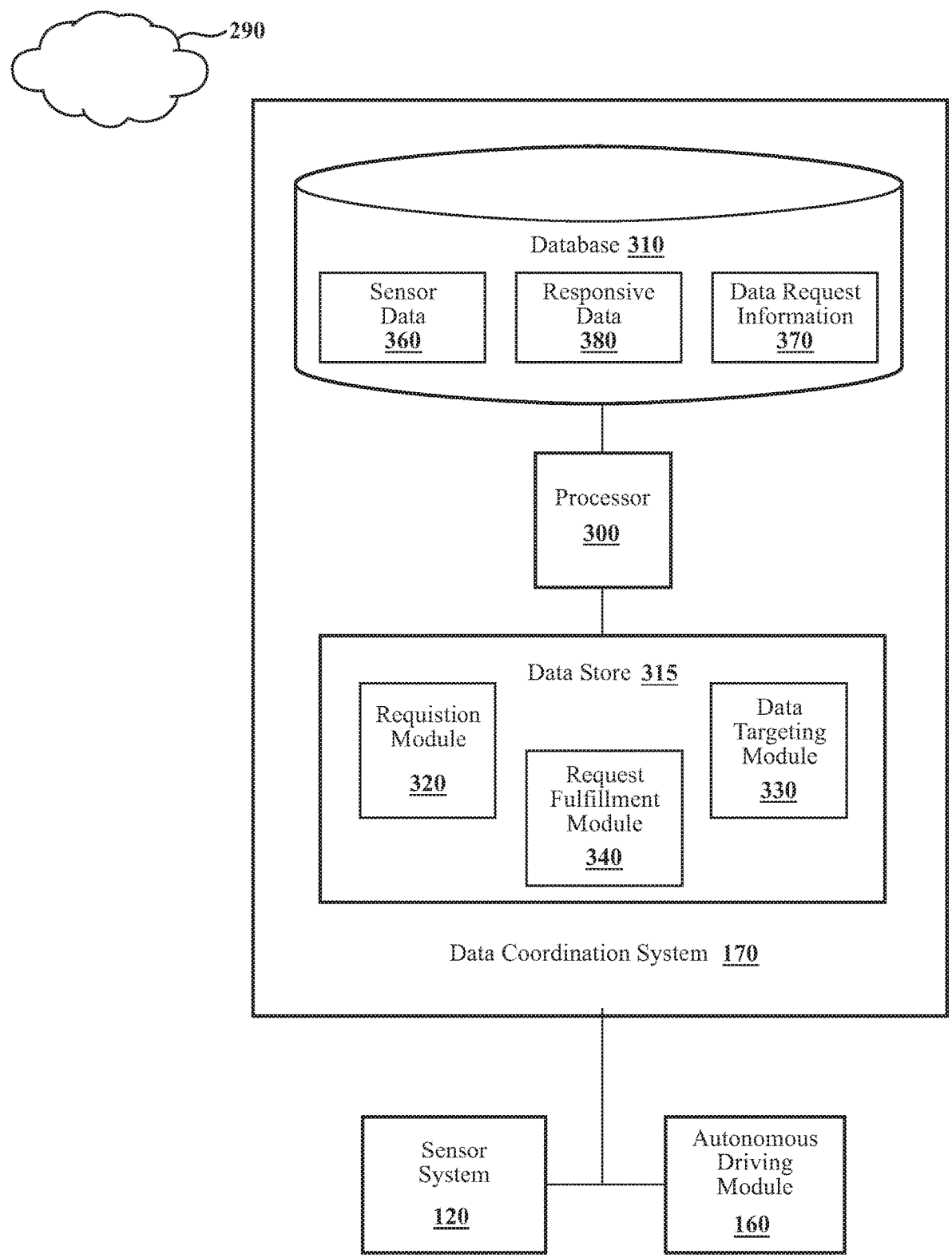
FIG. 3 is an illustration of the data coordination system for request-based data collection, according to embodiments described herein.

With reference to FIG. 3, one embodiment of the data coordination system 170, stored as part of the computing device 200, is further illustrated. The data coordination system 170 is shown as including a processor 300. The processor 300 can be a standalone processor, the processor 110 of the vehicle 100, the processor 204 of the computing device 200, or others. The processor 300 can be substantially similar to the processor 110, the processor 204, described with reference to FIG. 1 and FIG. 2, respectively. Accordingly, the processor 300 can be a part of the data coordination system 170, the data coordination system 170 can include a separate processor 300 from the processor 204 of the computing device 200, or the data coordination system 170 can access the processor 300 through a data bus or another communication path. In one embodiment, data coordination system 170 includes a data store 115 that can store a requisition module 320, a data targeting module 330, and a request fulfillment module 340. Further, the data coordination system 170 can include artificial or computational intelligence elements. The data store 315, as described in FIG. 1, can be a random-access memory (RAM), read-only memory (ROM), a hard-disk drive, a flash memory, or other suitable memory for storing the modules 320, 330, and 340. The modules 320, 330, and 340 are, for example, computer-readable instructions that when executed by the processor 300, cause the processor 300 to perform the various functions disclosed herein.

With continued reference to the data coordination system 170, in one embodiment, the data coordination system 170 can include the database 310. The database 310 can be stored in the data store 315. The database 310 is, in one embodiment, an electronic data structure stored in the data store 315 or another data store and that is configured with routines that can be executed by the processor 300 for analyzing stored data, providing stored data, organizing stored data, and so on. In another embodiment, the database 310 can be stored in the data store 115 of the vehicle 100, described with reference to FIG. 1. Thus, in one embodiment, the database 310 stores data used by the modules 320, 330, and 340 in executing various functions. In one embodiment, the database 310 includes sensor data 360 collected by the requisition module 320. The sensor data 360 can include the sensor data 119, described with reference to FIG. 1. In another embodiment, the database 310 can include further data request information 370 created by the data targeting module 330.

The data coordination system 170 can begin with instructions from the requisition module 320. In one embodiment, the requisition module 320 includes instructions to present a data request for sensor data to one or more vehicles. The data request can be a request for information, provided through a plurality of sources, regarding sensor data which is requested by one or more parties. The data request can include one or more request parameters for the data, the request parameters being indicative of the sensor data being responsive the data request. In one embodiment, the data request is transmitted to the capable vehicle(s) or the selection of capable vehicle(s). In this embodiment, the capable vehicle(s) or the selected subset of capable vehicle(s) receive the data request, as transmitted to the capable vehicle(s) from the data coordination system 170. In another embodiment, the data request is made available in a data request source. The data request source can be stored in a database, such as a data request information 370 in database 310. In this embodiment, the capable vehicle(s) can review the data request information 370 in the database 310, for data requests that the vehicle 100 is capable of fulfilling. In one embodiment, the capable vehicle(s) can collect the sensor data in response to the data request. In another embodiment, the capable vehicle(s) collect sensor data over time, the sensor data can then be referenced for responsive data.

The sensor data can be collected by the capable vehicle(s), using one or more sensors. Capable vehicle(s) is defined here as vehicles having one or more sensors capable of receiving the sensor data, the sensor data containing responsive data to the data request. Capable vehicle(s) can be autonomous vehicles, semi-autonomous vehicles or manually controlled vehicles. In one embodiment, capable vehicle(s) are a set of any vehicles having one or more of the sensors disclosed as part of the sensor system 120 of vehicle 100, described with reference to FIG. 1. In another embodiment, the capable vehicle(s) are substantially similar to the vehicle 100, described with reference to FIG. 1.

The requisition module 320 can generally include instructions that function to control the processor 300 to receive one or more data samples from the capable vehicle(s). In one embodiment, the requisition module 320 is configured as part of the remote server. In this embodiment, the requisition module 320 delivers instructions through the remote server to the capable vehicle, to control the collection or preparation of data samples. In further embodiments, the requisition module 320 relies on the one or more systems of the capable vehicle(s) to control the collection or preparation of data samples. Combinations or permutations of the embodiments described here are envisioned without specific recitation herein.

The data samples are a portion of data, such as a frame, taken from the sensor data. The data samples can be of any sample size which is less than the sensor data, such as a data sample which reflects two (2) seconds of collected data in the sensor data or a data sample which is less than or equal to three (3) MB. Further, the data samples can be a temporally selected subset of the sensor data. "Temporally selected" refers to the use of time in selecting the data samples. In one embodiment, the data sample is selected at specific time intervals, such as once every thirty seconds or once every minute. As such, the sample size and temporal selection are independently applied to the sensor data to create the data samples. The data samples can then be received by the requisition module 320, such as the requisition module 320 as stored in the computing device 200. The data samples can then be used by other modules, such as the data targeting module 330.

The data coordination system 170 can further include instructions from the data targeting module 330. The data targeting module 330 can generally include instructions that function to control the processor 300 to select a target data sample from the one or more data samples. The target data sample is one or more individual data samples which are selected form the data samples received by the requisition module 320. The target data sample can be selected based on one or more criteria related to the data requisition. The criteria for selection can include indications that the selected data sample represents data which fulfills the data request, such as detected objects, color ranges, differences between a first data sample and a second data sample, or others. In further embodiments, the data targeting module 330 can select more than one selected data sample.

The data targeting module 330 can further include instructions to create a selection range using the target data sample. The selection range is a set of parameters, based on the target data sample, which established a range of data to select from the sensor data. The selection range is the range of the sensor data which is believed to match the request parameters of the data request. The data targeting module 330 can use the target data sample as a selected point within or around the selection range. The data targeting module 330 can then set one or more parameters to create the selection range. In one example, the selection range is a temporal selection, such as a selection range of 1 minute before and 3 minutes after the time frame of the target data sample or a selection range of between time=−3 minutes and time=−10 minutes from a target data sample indicated to be taken at time=0. In another example, the selection range is a spectral selection. Spectral selection is defined as selection based on one or more detected wavelengths from the target sample data. Spectral selection can include a selection range of all data having one or more pixels within a given pixel color range, all data which has a peak at a specific wavelength or range of wavelengths, or others. One skilled in the art will understand the breadth of possible selection ranges, as disclosed herein.

The selection range can further be specific to each of the capable vehicle(s). Each of the capable vehicles can travel an individual route. As such, each of the capable vehicles can collect sensor data which is either temporally (e.g., same data collected at different times) or substantively (e.g., different data) different from the other capable vehicle(s). In situations where the sensor data is different, the data targeting module 330 can select a target data sample which reflects the data from that capable vehicle's sensor data which is responsive to the data request. The target data sample can then be applied to create separate selection ranges, which can then be applied to the sensor data from the respective capable vehicle(s), accordingly The data targeting module 330 can further include instructions to transmit the selection range to the one or more vehicles. The selection range is transmitted or otherwise provided to the capable vehicle(s). In one embodiment, the selection range can be provided to each of the capable vehicle(s) on an individual basis. The selection range can be applied to the sensor data, such as the sensor data 360 stored in the database 310, to create a selected data set from the sensor data 360. The selection range can be used to select the data set from the sensor data in a variety of ways, such as targeting said data, extracting data from the sensor data, targeting all data not included in the selection range, or others. In another embodiment, the selection range can be applied to the sensor data locally or remotely, such as by the capable vehicle or the computing device 200 using the data targeting module 330. The selected data set can then be stored in or copied to the responsive data 380 of the database 310, for later use in response to the data request.

The data coordination system 170 can further include instructions from the request fulfillment module 340. The request fulfillment module 340 can generally include instructions that function to control the processor 300 to identify excluded data of the sensor data for deletion. The excluded data can be the portions of the sensor data which fall outside of the selection range. The request fulfillment module 340 can receive information on the excluded data. The excluded data can then be marked or otherwise targeted for deletion. The excluded data can then be deleted. In one embodiment, the excluded data is deleted at the capable vehicle(s), such as prior to transmission of sensor data. In another embodiment, the excluded data is deleted at a remote recipient, which is outside of either the capable vehicle(s) or the computing device 200. In another embodiment, the excluded data is deleted at the computing device 200. In one or more embodiments, the excluded data is ignored or otherwise not used/transmitted.

The request fulfillment module 340 can further include instructions to receive the selected data set from the one or more vehicles. The selected data set, as described above, is portions of the sensor data 360 which is responsive to the data request. The selected data set can then be received by the request fulfillment module 340 from the capable vehicle(s). The selected data set can be transmitted using the network 290, described with reference to FIG. 2. The selected data set can be uploaded by request from the request fulfillment module 340, such as by a request forwarded to the capable vehicle using the network 290. In another embodiment, the selected data set can be transmitted at other intervals, such as at the end of the day or once the capable vehicle(s) is no longer in operation for the day.

The data coordination system 170 can thus provide a number of benefits in the field of data collection. The data coordination system 170 collects data which is responsive to a specific data request. The data coordination system 170 can then prevent the transmission of superfluous data or otherwise uninteresting data. Finally, the data coordination system 170 can reduce the use of bandwidth and space in collecting the data, thus increasing responsiveness and efficiency.

Figure 4:
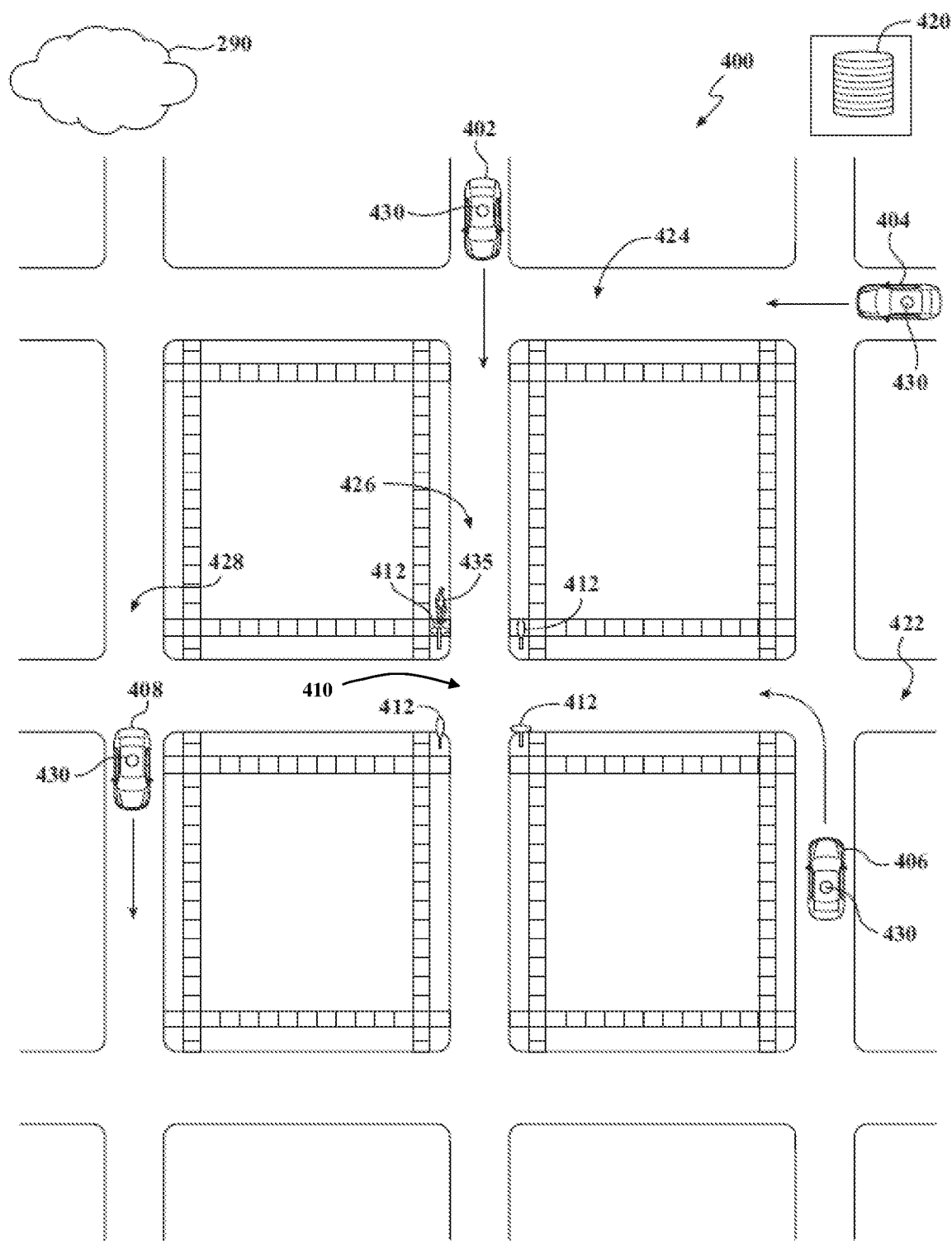
FIG. 4 is an illustration of a vehicle environment incorporating elements of the data coordination system, according to embodiments described herein.

FIG. 4 depicts a plurality of capable vehicles in operation with a data coordination system 170 in a vehicular environment 400, according to embodiments described herein. The vehicular environment 400 is depicted here as an overhead view of multiple streets in an urban setting. However, the exact location or type of location is not intended to be limiting. The embodiments described herein, will lend themselves to any environment which capable vehicles can move and interact, such as urban or rural settings, environments without paved roads, or others. The vehicular environment 400 is depicted with the plurality of capable vehicles, shown here as a first capable vehicle 402, a second capable vehicle 404, a third capable vehicle 406, and a fourth capable vehicle 408 (referred to herein individually or as "capable vehicles 402, 404, 406 and 408").

The capable vehicles 402, 404, 406 and 408 can have one or more sensor systems 430. The sensor systems 430 can be capable of collecting sensor data from the vehicular environment 400. The capable vehicles 402, 404, 406 and 408 can further include a processor 110, data stores 115, sensor systems 120, input systems 130, output systems 135, vehicle systems 140, autonomous driving modules 160 or combinations thereof. The systems of the capable vehicles 402, 404, 406 and 408 can differ between each of the capable vehicles 402, 404, 406 and 408. The capable vehicles 402, 404, 406 and 408 can be fully autonomous, semi-autonomous or manually driven vehicles, as described herein. In one embodiment, the capable vehicles 402, 404, 406 and 408 are substantially similar to the vehicle 100, described with reference to FIG. 1.

The capable vehicles 402, 404, 406 and 408 can move through the vehicular environment 400 using one or more roads, such as a first road 422, a second road 424, a third road 426, and a fourth road 428 (referred to herein individually or as "the roads 422, 424, 426 and 428"). The roads 422, 424, 426 and 428 can be any type of path or way leading between one place and another. The roads 422, 424, 426 and 428, though depicted as standard one lane paved roads, are not limited to those embodiments. The roads used herein can include streets, lanes, avenues, boulevards, freeways, highways, parkways, thoroughfares, thruways, turnpikes, unpaved or "dirt" roads, and other paths of ingress and egress which can be used by vehicles.

The vehicular environment 400 can further include a request location 410. The request location 410 is a location within the environment which is expected or understood to produce the portion of the sensor data which is responsive to a data request. The request location 410 can be more than one location within the vehicular environment, such as when the data request calls for information from multiple sites or when the data request calls for information about objects which can change in location over time. Shown here, the request location 410 is a four-way intersection having four stop signs 412. The four stop signs 412 shown here control movement within the intersection.

In this example, the data coordination system 170 is stored as part of the remote server 420. The computing device 200 can include a processor 204, an output 216, an input 202, a memory 214, a data coordination system 170, or combinations thereof, described with reference to FIG. 2. In one embodiment, the remote server 420 is substantially similar to the computing device 200, described with reference to FIG. 2. In further embodiments, the remote server 420 is an intermediate device between the capable vehicles 402, 404, 406 and 408 and the computing device 200. The remote server 420 can be in communication with or connected to a network, such as the network 290. The network 290, which can be wired or wireless, can allow the data coordination system 170 to communicate with other computing devices or capable vehicles, locally or remotely, such as over a network protocol (e.g., Ethernet or similar protocols). The network 290 can be substantially similar to the network 290, described above with reference to FIG. 2.

By way of example, the data coordination system 170 can start with the requisition module 320 presenting a data request for sensor data to one or more vehicles. The data request can be a request for information, provided through a plurality of sources, regarding sensor data which is requested by one or more parties. The data request can include one or more request parameters for the data, which are necessary for the sensor data to fulfill the data request. In this example, the data request is a request for data on people crossing the street at the intersection, shown at the request location 410, during daylight hours. The data request, as described here, includes one or more request parameters for the data. Shown here, the request parameters include the location of the intersection, a broad time frame for the data, and related to an event at the intersection (e.g., people crossing the street). The request parameters are indicative that the sensor data responsive to the data request must be taken during the day while the sun is out, the sensor data must be from the intersection and include people either actually or preparing to cross the street.

The requisition module 320 can further select vehicles of the capable vehicles 402, 404, 406 and 408 that are positioned to collect sensor data that can fulfill the data request. In this case, the second capable vehicle 404 and the fourth capable vehicle 408 are directed to a route which will not cross the request location 410. However, the first capable vehicle 402 and the third capable vehicle 406 will cross the request location 410 at some point in their path. As such, the requisition module 320 can restrict the selected vehicles to the first capable vehicle 402 and the third capable vehicle 406.

The capable vehicles 402, 404, 406 and 408 can then move through the vehicular environment 400, based on a pre-established path, such as in autonomous vehicles, or based on manual control. The requisition module 320 can generally include instructions that function to control the processor 300 to receive one or more data samples from the capable vehicle(s), in this case the first capable vehicle 402 and the third capable vehicle 406. In one embodiment, the requisition module 320 can send instructions to first capable vehicle 402 and the third capable vehicle 406 to produce and send the data sample. The data sample is a sample of the sensor data, as described above with reference to FIG. 2. The first capable vehicle 402 and the third capable vehicle 406 then send the data samples based on the temporal selection criteria set, such as every 30 seconds. In this example, the temporal selection criteria is arbitrarily selected to be every 30 seconds, however the embodiments described herein are not limited to a specific time frame. The first capable vehicle 402 and the third capable vehicle 406 move through the environment up to and including the request location 410.

The data targeting module 330 can then select a target data sample from the one or more data samples. The data samples can be sent through the network 290 to the remote server 420. The data targeting module 330 can then select a data sample based on the time stamp of the sample, visual indicators in the sample, or others. The selection can be based on the one or more criteria described with reference to FIG. 3. In this example, the target data sample is selected from a time frame where the first capable vehicle 402 and the third capable vehicle 406, were located at or in the request location 410. The selected data samples include a sound sample, a visual sample, and radar sample, and others as available from the sensor system 430. The first capable vehicle 402 and the third capable vehicle 406 received sensor data regarding a person 435, in some position regarding the first road 422 and the third road 426. The data targeting module 330 selects the selected data sample and determines that the person 435 is preparing to cross the third road 426 from the sensor data of the first capable vehicle 402 and actually crossing the third road 426 from the sensor data of the third capable vehicle 406. The selected data sample can be substantially similar to the selected data sample, described with reference to FIG. 3.

Using the selected data samples, the data targeting module 330 creates a selection range. The selection range is a range created at or around the selected data sample, intended to capture the sensor data responsive to the data request. The selection range can be substantially similar to the selection range described with reference to FIG. 3. The selection range is selected separately for the first capable vehicle 402 and the third capable vehicle 406, as each vehicle enters the request location from a different angle and at a different time. Further, the first capable vehicle 402 and the third capable vehicle 406 each receive different input regarding the person 435. The first capable vehicle 402 received data regarding the person 435, as prepared to cross the third road 426. The third capable vehicle 406 received sensor data regarding the person 435 as they were in the middle of crossing the third road 426. Thus, the selection range is selected for each vehicle in light of the respective sensor data, as indicated in the data sample.

The selection range is then transmitted to the first capable vehicle 402 and the third capable vehicle 406 by the data targeting module 330. The selection range can be transmitted by the data targeting module using the network 290. The selection range can be applied to create a selected data set from the sensor data. In this example, the selection range for first capable vehicle 402 is 2 minutes before and after the selected data sample time point. The selection range for the third capable vehicle 406 is a range of from 30 seconds before to 2 minutes and 30 second before the time stamp of the selected data sample. In another embodiment, the selection range can be applied to the sensor data locally or remotely, such as by the capable vehicle or the computing device 200 using the data targeting module 330. Shown here, the first capable vehicle 402 and the third capable vehicle 406 apply the selection range, as transmitted by the data targeting module, to create the selected data set. The selected data set is the data which corresponds to the selection range.

The first capable vehicle 402 and the third capable vehicle 406 then receive instructions to prepare the sensor data and the selected data set for transmission. The request fulfillment module 340 then sends instructions to identify excluded data of the sensor data for deletion. The excluded data can be the portions of the sensor data which fall outside of the selection range. The excluded data can be selected based on multiple selection ranges, such as if the first capable vehicle 402 and the third capable vehicle 406 have fulfilled multiple data requests during the day. The request fulfillment module 340 can receive information on the excluded data. The excluded data can then be marked or otherwise targeted for deletion. In this example, the excluded data is marked by the request fulfillment module using the processor 110 of the first capable vehicle 402 and the third capable vehicle 406. The excluded data is then deleted at the first capable vehicle 402 and the third capable vehicle 406, through instructions from the request fulfillment module 340, prior to transmission of sensor data. The information collected by the sensor system 430 can be transmitted or retained in a variety of ways, such as actively uploaded by the first capable vehicle 402 and the third capable vehicle 406 to the remote server 420 through the network 290, stored locally by the first capable vehicle 402 and the third capable vehicle 406 for uploading to the computing device 200, or others.

The request fulfillment module 340 can further include instructions to receive the selected data set from the one or more vehicles. Shown here, the first capable vehicle 402 and the third capable vehicle 406 receive instructions from the request fulfillment module 340 to send a transmission of the selected data set. The selected data set can be stored in a database, such as the responsive data 380 stored in the database 310, described with reference to FIG. 3. The selected data, as described above, is the data which is responsive to the data request. The selected data is then received by the request fulfillment module 340 from the first capable vehicle 402 and the third capable vehicle 406. The selected data can be uploaded by request from the request fulfillment module 340. In another embodiment, the selected data can be transmitted at other intervals, such as at the end of the day or once the capable vehicle(s) is no longer in operation for the day.

Figure 5:
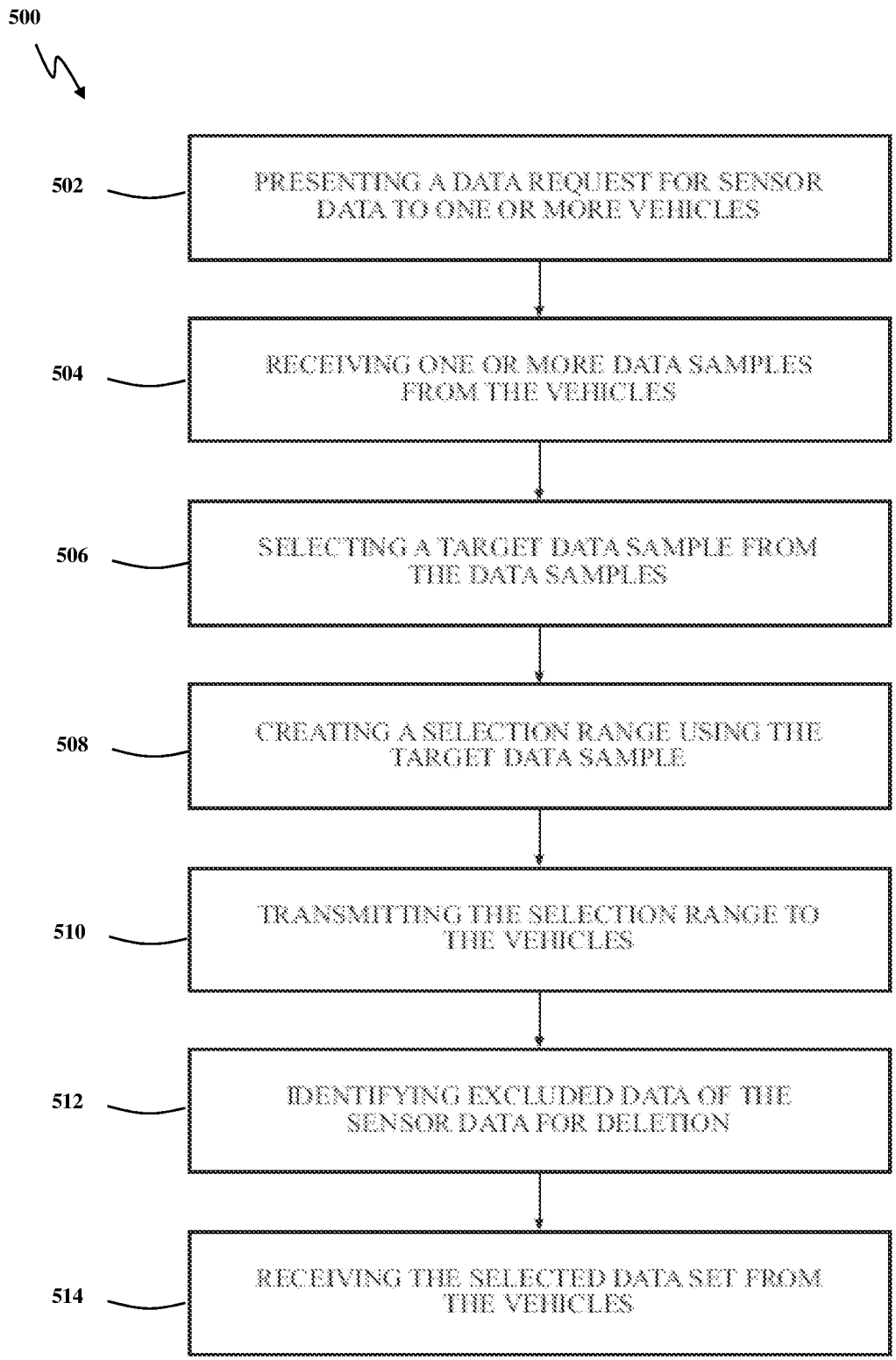
FIG. 5 is a flow diagram of a method for request-based data collection, according to embodiments described herein.

FIG. 5 is a flow diagram of method 500 for request-based data collection, according to embodiments described herein. The method 500 includes providing a data request to one or more capable vehicles. Then, the vehicles collect sensor data over a period of time, wherein the data collection, the capable vehicles or both are selected by the method 500. The sensor data is restricted to a subset of data, based on selected data samples received by the method 500, to reduce the size of the sensor data, as well as non-responsive data stored therein. The method 500 can include presenting a data request for sensor data to one or more vehicles, at 502. Then, the data samples can be received from the vehicle, at 504. A target data sample can then be selected from the data samples, at 506. Then, a selection range can be created using the target data sample, at 508. The selection range can then be transmitted to the vehicle, at 510. The excluded data of the sensor data can be identified for deletion, at 512. Then, the selected data set can be received from the vehicle, at 514.

The method 500 can begin by presenting a data request for sensor data to one or more vehicles, at 502. The data request can be presented to the vehicle, such as a capable vehicle described above with reference to FIGS. 3 and 4. The sensor data can be collected using one or more sensors. The sensors can be sensors as described above with reference to FIGS. 1-3. The sensor data can be collected in response to the data request or collected continuously, including sensor data responsive to the data request. In one embodiment, the data request is presented as part of a system, such as the data coordination system 170 described with reference to FIG. 3. The data coordination system 170 can begin with instructions from the requisition module 320. In this embodiment, the requisition module 320 can includes instructions to present a data request for sensor data to one or more vehicles, as described above. The data request can be stored in a database, such as the data request information 370, stored in database 310, described with reference to FIG. 3. The requisition module 320 then provides the data request from the database 310, to the vehicle(s). The sensor data can then be collected and stored in a database, such as part of the sensor data 360 in the database 310, described with reference to FIG. 3. The sensor data 360 can be stored in the database 360.

Then, the data samples can be received from the vehicle, at 504. The vehicle can send one or more data samples which reflect portions of the sensor data. The data samples can be substantially similar to the data samples described above with reference to FIG. 3. The one or more data samples can be a temporally selected subset of the sensor data. Temporally selected refers to the use of time as a production criteria in creating or sending the data samples. In one embodiment, the data samples are created and received as part of a system, such as the data coordination system 170 described with reference to FIG. 3. The data coordination system 170 can continue with instructions from the requisition module 320. In this embodiment, the requisition module 320 can generally include instructions that function to control the processor 300 to receive one or more data samples from the capable vehicle(s), as described above. The sensor data can then be collected and stored in a database, such as part of the sensor data 360 in the database 310, described with reference to FIG. 3. The data samples can be selected from the sensor data stored in the sensor data 360 of the database 310.

A target data sample can then be selected from the data samples, at 506. As described above, a plurality of data samples can be received. Here, a target data sample can be selected to fulfill the data request. The target data selection can be based on one or more data selection parameters, such as time frame, pixel ranges or others, described above with reference to FIGS. 3 and 4. The target data sample indicates that data in one or more ranges related to the selected data sample, is likely to fulfill the data request. In one embodiment, the selected data samples can be chosen as part of a system, such as the data coordination system 170 described with reference to FIG. 3. The data coordination system 170 can continue with instructions from the data targeting module 330. The data coordination system 170 can further include instructions from the data targeting module 330. The data targeting module 330 can generally include instructions that function to control the processor 300 to select a target data sample from the one or more data samples. The selected data samples can be chosen from the data samples selected from the sensor data 360 of the database 310.

Then, a selection range can be created using the target data sample, at 508. The selection range is a range produced from the selected data sample which contains or relates to sensor data which fulfills a data request. The selection range can be selected based on a variety of criteria around the selected data sample. The selection range can be selected as described with reference to FIG. 3. In one embodiment, the selection range includes the time frame of the selected data sample. In another embodiment, the selection range includes spectral information derived from the selected data sample. The selection range can further be specific to each of the vehicle(s). Each of the vehicles can travel an individual route. As such, each of the vehicles can collect sensor data which is either temporally (e.g., same data collected at different times) or substantively (e.g., different data) different from the other vehicle(s). In one embodiment, the selection range can be chosen as part of a system, such as the data coordination system 170 described with reference to FIG. 3. The data coordination system 170 can continue with instructions from the data targeting module 330. The data coordination system 170 can further include instructions from the data targeting module 330. The data targeting module 330 can further include instructions to create a selection range using the target data sample. The selected data samples can be chosen from the data samples selected from the sensor data 360 of the database 310. The data targeting module 330 can then produce a selection range using the data samples as applied to the sensor data 360 or known parameters of the sensor data.

The selection range can then be transmitted to the vehicle, at 510. The selection range can be transmitted to the vehicle through a network, such as the network 290. The selection range can be applied to create a selected data set from the sensor data. The selected data set is the portion of the sensor data which corresponds to the selection range. The selected data set can be marked, allocated or otherwise targeted for later use in the data request. In one embodiment, the selection range can be chosen as part of a system, such as the data coordination system 170 described with reference to FIG. 3. The data coordination system 170 can continue with instructions from the data targeting module 330. The data coordination system 170 can further include instructions from the data targeting module 330. The data targeting module 330 can further include instructions to transmit the selection range to the one or more vehicles. The selection range is transmitted or otherwise provided to the vehicle(s).

The data targeting module 330 can then apply the selection range to the sensor data 360 to create a selected data set.

The excluded data of the sensor data can be identified for deletion, at 512. The excluded data can be outside of the selection range. The excluded data can be the portions of the sensor data which are not part of the selected data set. The excluded data can be marked, targeted or otherwise identified for deletion. The excluded data can be deleted by the vehicle or a remote device, such as the computing device 200, described with reference to FIG. 2. The excluded data can be selected based on the sensor type, such as keeping all data received from radar, but applying exclusion to other data types, based on the selection range. In one embodiment, the excluded data can be identified as part of a system, such as the data coordination system 170 described with reference to FIG. 3. The data coordination system 170 can further include instructions from the request fulfillment module 340. The request fulfillment module 340 can include instructions that function to control the processor 300 to identify excluded data of the sensor data for deletion, such as portions of the sensor data 360 in the database 310. The excluded data can be the portions of the sensor data 360 which fall outside of the selection range. The request fulfillment module 340 can receive information on the excluded data from the vehicle. The excluded data can then be marked or otherwise targeted for deletion. The excluded data can be deleted locally or remotely, as described above with reference to FIGS. 3 and 4.

Then, the selected data set can be received from the vehicle, at 514. The selected data set, as described above, can be the portions of the sensor data which are responsive to the data request. The selected data set can be included as part of the sensor data in the transmission, or the selected data set can be sent separately. The selected data set can be transmitted at a variety of times, such as continuously or after the vehicle is no longer in use. The selected data set can be transmitted using a network, such as the network 290 described with reference to FIGS. 2 and 3. In one embodiment, the selected data set can be transmitted as part of a system, such as the data coordination system 170 described with reference to FIG. 3. The data coordination system 170 can continue with instructions from the request fulfillment module 340. The request fulfillment module 340 can further include instructions to receive the selected data set from the one or more vehicles. The selected data set, as described above, is the data which is responsive to the data request. The selected data set is then received by the request fulfillment module 340 from the capable vehicle(s). The selected data set can be uploaded by request from the request fulfillment module 340.

FIG. 1 will now be discussed in full detail as an example vehicle environment within which the system and methods disclosed herein may operate. In some instances, the vehicle 100 is configured to switch selectively between an autonomous mode, one or more semi-autonomous operational modes, and/or a manual mode. Such switching also referred to as handover when transitioning to a manual mode can be implemented in a suitable manner, now known or later developed. "Manual mode" means that all of or a majority of the navigation and/or maneuvering of the vehicle is performed according to inputs received from a user (e.g., human driver/operator).

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing devices to control the vehicle 100 with minimal or no input from a human driver/operator. In one or more embodiments, the vehicle 100 is highly automated or completely automated. In one embodiment, the vehicle 100 is configured with one or more semi-autonomous operational modes in which one or more computing devices perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route. Thus, in one or more embodiments, the vehicle 100 operates autonomously according to a particular defined level of autonomy.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operably connected to the processor(s) 110 for use thereby. The term "operably connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed. In one or more arrangement, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas.

In one or more arrangement, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120. In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can function independently from each other. Alternatively, two or more of the sensors can work in combination with each other. In such a case, the two or more sensors can form a sensor network. The sensor system 120 and/or the one or more sensors can be operably connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes and data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. Moreover, the sensor system 120 can include operator sensors that function to track or otherwise monitor aspects related to the driver/operator of the vehicle 100. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras, infrared (IR) cameras and so on. In one embodiment, the cameras 126 include one or more cameras disposed within a passenger compartment of the vehicle for performing eye-tracking on the operator/driver in order to determine a gaze of the operator/driver, an eye track of the operator/driver, and so on.

The vehicle 100 can include an input system 130. An "input system" includes any device, component, system, element or arrangement or groups thereof that enable information/data to be entered into a machine. The input system 130 can receive an input from a vehicle passenger (e.g. a driver or a passenger). The vehicle 100 can include an output system 135. An "output system" includes any device, component, or arrangement or groups thereof that enable information/data to be presented to a vehicle passenger (e.g. a person, a vehicle passenger, etc.).

The vehicle can further include a communication system 131. The communication system 131 can be include a display device 132, audio devices 133 (e.g., speakers and microphones), and one or more input devices 134. The one or more input devices can include sensors, such as cameras, infrared devices, biometric devices, or others. The input devices 134 can further include a touch screen or manual buttons. The communications system can be in communication with the data coordination system 170, either locally or remotely, such as through a network 190. The communication system 131 can be connected with the vehicle permanently or semi-permanently. Further, the communication system 131 can be divided into components, with portions thereof being permanently part of the vehicle 100, while other components of the communication system 131 can be removed.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combination thereof, now known or later developed.

The navigation system 147 can include one or more devices, sensors, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the data coordination system 170, and/or the autonomous driving module(s) 160 can be operably connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the data coordination system 170, and/or the autonomous driving module(s) 160 may control some or all of these vehicle systems 140 and, thus, may be partially or fully autonomous.

The processor(s) 110, the data coordination system 170, and/or the autonomous driving module(s) 160 can be operably connected to communicate with the various vehicle systems 140 and/or individual components thereof. For example, returning to FIG. 1, the processor(s) 110, the data coordination system 170, and/or the autonomous driving module(s) 160 can be in communication to send and/or receive information from the various vehicle systems 140 to control the movement, speed, maneuvering, heading, direction, etc. of the vehicle 100. The processor(s) 110, the data coordination system 170, and/or the autonomous driving module(s) 160 may control some or all of these vehicle systems 140.

The processor(s) 110, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, and/or the autonomous driving module(s) 160 can control the direction and/or speed of the vehicle 100. The processor(s) 110 and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operably connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g. one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

The flowcharts and block diagrams in the figures illustrate the architecture, functionality, and operation of possible embodiments of systems, methods and computer program products according to various embodiments. In this regard, each block in the flowcharts or block diagrams can represent a module, segment, or portion of code, which includes one or more executable instructions for implementing the specified logical function(s). It should also be noted that, in some alternative embodiments, the functions noted in the block can occur out of the order noted in the Figures. For example, two blocks shown in succession can, in fact, be executed substantially concurrently, or the blocks can sometimes be executed in the reverse order, depending upon the functionality involved.

The systems, components and/or methods described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or methods also can be embedded in a computer-readable storage, such as a computer program product or other data programs storage device, readable by a machine, tangibly embodying a program of instructions executable by the machine to perform methods and methods described herein. These elements also can be embedded in an application product which includes all the features enabling the embodiment of the methods described herein and, which when loaded in a processing system, is able to carry out these methods.

Furthermore, arrangements described herein can take the form of a computer program product embodied in one or more computer-readable media having computer-readable program code embodied or embedded, such as stored thereon. Any combination of one or more computer-readable media can be utilized. The computer-readable medium can be a computer-readable signal medium or a computer-readable storage medium. The phrase "computer-readable storage medium" means a non-transitory storage medium. A computer-readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium can be any tangible medium that can contain, or store a program for use by or in connection with an instruction execution system, apparatus, or device.

Program code embodied on a computer-readable medium can be transmitted using any appropriate medium, including but not limited to wireless, wireline, optical fiber, cable, RF, etc., or any suitable combination of the foregoing. Computer program code for carrying out operations for aspects of the present arrangements can be written in any combination of one or more programming languages, including an object-oriented programming language such as Java™, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer, or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as including (i.e., open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

While the foregoing is directed to embodiments of the disclosed devices, systems, and methods, other and further embodiments of the disclosed devices, systems, and methods can be devised without departing from the basic scope thereof. The scope thereof is determined by the claims that follow.

What is claimed is:

1. A data coordination system for request-based data collection, comprising:
   one or more processors; and
   a memory communicably coupled to the one or more processors and storing instructions that when executed by the one or more processors cause the one or more processors to:
     present a data request for sensor data to a plurality of vehicles, the data request including a number or a number range of incidents to collect, the plurality of vehicles including a number of vehicles that is less than the requested number or the requested number range of incidents, the sensor data being collected using one or more sensors, the sensor data including at least one of vehicle data and driving environment data, the data request including data about a particular location or type of location and at least one of: data from a particular time of day, data from a particular type of sensor, data about an event, data about a traffic condition, data about a traffic scenario, and data about pedestrians;
     receive one or more data samples from the plurality of vehicles, the one or more data samples being a sample size corresponding to an amount of storage space that is a subset of the amount of storage space of the sensor data, the one or more data samples being a temporally selected subset of the sensor data in which the data is selected at specific time intervals, the temporally selected subset being less than the sensor data;
select a target data sample from the one or more data samples based on one or more criteria from the data request for sensor data;
create a selection range using the target data sample, the selection range being created based on one or more parameters that establish a range of data to select from the sensor data, the one or more parameters including at least one of a temporal selection and a spectral selection, the selection range being selected separately for each of the plurality of vehicles, the selection range based on at least one of an angle at which the vehicle enters the requested particular location or the requested type of location and a time in which the vehicle enters the requested particular location or the requested type of location;
transmit, in real-time, the selection range to the plurality of vehicles, whereby the plurality of vehicles apply the selection range to the sensor data to create a selected data set;
transmit, in real-time, instructions to cause the plurality of vehicles to identify excluded data of the sensor data for deletion, the excluded data being outside of the selection range,
transmit, in real-time, instructions to cause the plurality of vehicles to delete the excluded data prior to transmission of the selected data set, whereby the plurality of vehicles delete the excluded data, whereby the use of storage space on the plurality of vehicles is reduced in real-time in a centrally coordinated manner; and
receive, in real-time, the selected data set from the plurality of vehicles, the selected data set being responsive to the data request, whereby the transmission of superfluous data or otherwise uninteresting data is prevented and the use of bandwidth is reduced in a centrally coordinated manner.

2. The data coordination system of claim 1, wherein the sensor data is collected in response to the data request.

3. The data coordination system of claim 1, wherein the instructions further include:
create the selection range based on one or more parameters, the one or more parameters comprising time range, color range, pixel selection, or combinations thereof.

4. The data coordination system of claim 1, wherein the instructions further include:
select one or more capable vehicles from the plurality of vehicles, the one or more capable vehicles being chosen based on ability to fulfill at least a portion of the data request.

5. The data coordination system of claim 1, wherein the excluded data is deleted by the plurality of vehicles.

6. The data coordination system of claim 5, wherein the selected data set is received as part of the sensor data.

7. A non-transitory computer-readable medium for request-based data collection and storing instructions that when executed by one or more processors cause the one or more processors to:
present a data request for sensor data to plurality of vehicles, the data request including a number or a number range of incidents to collect, the plurality of vehicle including a number of vehicles that is less than the requested number or the requested number range of incidents, the sensor data being collected using one or more sensors, the sensor data including at least one of vehicle data and driving environment data, the data request including data about a particular location or type of location and at least one of: data from a particular time of day, data from a particular type of sensor, data about an event, data about a traffic condition, data about a traffic scenario, and data about pedestrians;
receive one or more data samples from the plurality of vehicles, the one or more data samples being a sample size corresponding to an amount of storage space that is a subset of the amount of storage space of the sensor data, the one or more data samples being a temporally selected subset of the sensor data in which the data is selected at specific time intervals, the temporally selected subset being less than the sensor data;
select a target data sample from the one or more data samples based on one or more criteria from the data request for sensor data;
create a selection range using the target data sample, the selection range being created based on one or more parameters that establish a range of data to select from the sensor data, the one or more parameters including at least one of a temporal selection and a spectral selection, the selection range being selected separately for each of the plurality of vehicles, the selection range based on at least one of an angle at which the vehicle enters the requested particular location or the requested type of location and a time in which the vehicle enters the requested particular location or the requested type of location;
transmit, in real-time, the selection range to the plurality of vehicles, whereby the plurality of vehicles apply the selection range to create a selected data set;
transmit, in real-time, instructions to cause the plurality of vehicles to identify excluded data of the sensor data for deletion, the excluded data being outside of the selection range, transmit, in real-time, instructions to cause the plurality of vehicles to delete the excluded data prior to transmission of the selected data set, whereby the plurality of vehicles delete the excluded data, whereby the use of storage space on the plurality of vehicles is reduced in real- time in a centrally coordinated manner; and
receive, in real-time, the selected data set from the plurality of vehicles, the selected data set being responsive to the data request, whereby the transmission of superfluous data or otherwise uninteresting data is prevented and the use of bandwidth is reduced in a centrally coordinated manner.

8. The computer-readable medium of claim 7, wherein the sensor data is collected in response to the data request.

9. The computer-readable medium of claim 7, further comprising instructions to create the selection range based on one or more parameters, the one or more parameters comprising time range, color range, pixel selection, or combinations thereof.

10. The computer-readable medium of claim 7, further comprising instructions to select one or more capable vehicles from the plurality of vehicles, the one or more capable vehicles being chosen based on ability to fulfill at least a portion of the data request.

11. The computer-readable medium of claim 7, wherein the excluded data is deleted by the plurality of vehicles.

12. The computer-readable medium of claim 11, wherein the selected data set is received as part of the sensor data.

13. A method for request-based data collection, the method comprising:

presenting a data request for sensor data to plurality of vehicles, the data request including a number or a number range of incidents to collect, the plurality of vehicles including a number of vehicles that is less than the requested number or the requested number range of incidents, the sensor data being collected using one or more sensors, the sensor data including at least one of vehicle data and driving environment data, the data request including data about a particular location or type of location and at least one of: data from a particular time of day, data from a particular type of sensor, data about an event, data about a traffic condition, data about a traffic scenario, and data about pedestrians;

receiving one or more data samples from the plurality of vehicles, the one or more data samples being a sample size corresponding to an amount of storage space that is a subset of the amount of storage space of the sensor data, the one or more data samples being a temporally selected subset of the sensor data in which the data is selected at specific time intervals, the temporally selected subset being less than the sensor data;

selecting a target data sample from the one or more data samples based on one or more criteria from the data request for sensor data;

creating a selection range using the target data sample, the selection range being created based on one or more parameters that establish a range of data to select from the sensor data, the one or more parameters including at least one of a temporal selection and a spectral selection, the selection range being selected separately for each of the plurality of vehicles, the selection range based on at least one of an angle at which the vehicle enters the requested particular location or the requested type of location and a time in which the vehicle enters the requested particular location or the requested type of location;

transmitting, in real-time, the selection range to the plurality of vehicles, whereby the plurality of vehicles apply the selection range to the sensor data to create a selected data set;

transmitting, in real-time, instructions to cause the plurality of vehicles to identify excluded data of the sensor data for deletion, the excluded data being outside of the selection range, transmitting, in real-time, instructions to cause the plurality of vehicles to delete the excluded data prior to transmission of the selected data set, whereby the one or more vehicles delete the excluded data, whereby the use of storage space on the plurality of vehicles is reduced in real-time in a centrally coordinated manner; and receiving, in real-time, the selected data set from the plurality of vehicles, the selected data set being responsive to the data request, whereby the transmission of superfluous data or otherwise uninteresting data is prevented and the use of bandwidth is reduced in a centrally coordinated manner.

14. The method of claim 13, wherein the sensor data is collected in response to the data request.

15. The method of claim 13, further comprising creating the selection range based on one or more parameters, the one or more parameters comprising time range, color range, pixel selection, or combinations thereof.

16. The method of claim 13, further comprising selecting one or more capable vehicles from the plurality of vehicles, the one or more capable vehicles being chosen based on ability to fulfill at least a portion of the data request.

17. The method of claim 13, wherein the excluded data is deleted by the plurality of vehicles, and wherein the selected data set is received as part of the sensor data.

* * * * *

UNITED STATES PATENT AND TRADEMARK OFFICE
CERTIFICATE OF CORRECTION

| | |
|---|---|
| PATENT NO. | : 11,386,055 B2 |
| APPLICATION NO. | : 15/903497 |
| DATED | : July 12, 2022 |
| INVENTOR(S) | : Michalakis |

It is certified that error appears in the above-identified patent and that said Letters Patent is hereby corrected as shown below:

In the Specification

Column 13, Line 47: Delete "database 360." and insert --database 310.--

In the Claims

Claim 7, Column 23, Line 65: Delete "vehicle including" and insert --vehicles including--

Signed and Sealed this
Twenty-seventh Day of September, 2022

Katherine Kelly Vidal
*Director of the United States Patent and Trademark Office*